United States Patent [19]

Duncan et al.

[11] Patent Number: 4,704,323

[45] Date of Patent: Nov. 3, 1987

[54] RESIN FILM LAMINATE

[75] Inventors: Gary L. Duncan, Fairport, N.Y.; Randal J. Hasenauer, St. Charles, Ill.

[73] Assignee: Mobil Oil Corporation, New York, N.Y.

[21] Appl. No.: 1,256

[22] Filed: Jan. 7, 1987

[51] Int. Cl.$^4$ .......................... B32B 3/26; B32B 7/02
[52] U.S. Cl. ................................. 428/286; 428/313.3; 428/315.5; 428/316.6; 428/317.9; 428/323; 428/910
[58] Field of Search ................. 428/286, 313.3, 313.5, 428/313.9, 315.5, 315.7, 315.9, 316.6, 317.9, 323, 325, 327, 328, 910

[56] References Cited

U.S. PATENT DOCUMENTS

| | | | |
|---|---|---|---|
| 3,676,242 | 7/1972 | Prentice | 156/62.4 |
| 4,180,427 | 12/1979 | Bertsch | 156/272 |
| 4,254,173 | 3/1981 | Peer, Jr. | 428/204 |
| 4,377,616 | 3/1983 | Ashcraft et al. | 428/317.9 |
| 4,438,175 | 3/1984 | Aschcraft et al. | 428/317.9 |
| 4,496,620 | 1/1985 | Park et al. | 428/323 |
| 4,560,614 | 12/1985 | Park | 428/317.9 |
| 4,578,297 | 3/1986 | Duncan | 428/317.9 |
| 4,582,736 | 4/1986 | Duncan | 428/317.9 |
| 4,582,752 | 4/1986 | Duncan | 428/317.9 |
| 4,582,753 | 4/1986 | Duncan | 428/317.9 |
| 4,626,460 | 12/1986 | Duncan | 428/317.9 |
| 4,632,869 | 12/1986 | Park et al. | 428/317.9 |

Primary Examiner—William J. Van Balen
Attorney, Agent, or Firm—Alexander J. McKillop; Michael G. Gilman; Charles J. Speciale

[57] ABSTRACT

A paper-containing laminate is disclosed which comprises:

(a) an outer layer of opaque biaxially oriented polymer film structure of lustrous satin appearance which comprises:

(i) a thermoplastic polymer matrix core having an upper surface and a lower surface and within which is located a strata of voids; positioned at least substantially within at least a substantial number of voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void;

(ii) a void-free thermoplastic skin layer adhering to at least the upper surface of said core layer, said skin layer being of a thickness such that the outer, exposed surface thereof does not, at least substantially, manifest the surface irregularities of said core layer; the population of voids in said core and the thickness of said core being such as to cause a degree of opacity of less than 70% light transmission; and, (b) a substrate web layer selected from the group consisting of paper and non-woven tissue, the upper surface of which is affixed directly or indirectly to the lower surface of the core layer (a)(i) with or without a laminating adhesive interposed between said surfaces.

14 Claims, No Drawings

RESIN FILM LAMINATE

BACKGROUND OF THE INVENTION

In some types of packaging material, paper, paperboard and other types of cellulose-based webs (collectively referred to herein as "paper") are provided with a smooth white surface, e.g., with a clay-titanium dioxide-latex mixture, in order to permit decoration of the naturally brown, rough surface of the underlying cellulosic material. In some cases, a white outer surface is provided through the lamination of an outer thin plastic layer which increases the tear strength of the underlying cellulosic web. See, for example, U.S. Pat. No. 4,254,173, the contents of which are incorporated by reference herein.

A problem which affects the appearance, and ultimately the economics, of laminations of thin plastic films to paper is the show-through or transmittance of the surface texture of the paper surface through the relatively thin polymer film. The result is that comparatively expensive coated grades of paper are used to project a smooth surface rather than less expensive uncoated, rougher surfaced sheets.

U.S. Pat. No. 4,377,616, the contents of which are incorporated by reference herein, discloses an opaque biaxially oriented polymer film structure comprising a thermoplastic polymer matrix core layer possessing numerous voids, a substantial number of which contain at least one spherical void-initiating particle, and transparent skin layers adhering to the surfaces of the core layer. The unique structure of the core layer imparts a much higher degree of opacity, possibly due to the effects of light scattering, than that possible by the use of opacifying pigment alone. There is no disclosure or suggestion in U.S. Pat. No. 4,377,616, however, of laminating the film structure disclosed therein to paper or other web, either directly or indirectly through an intermediate polymer foam layer. Although U.S. Pat. No. 3,676,242 discloses a laminate of a melt-blown non-woven mat and a polyolefin film, there is no suggestion of employing a film layer possessing anything like the lustrous, opaque appearance polymer film structure of aforesaid U.S. Pat. No. 4,377,616. Laminates of thermoplastic polymer foams and kraft paper are known from U.S. Pat. No. 4,180,427.

SUMMARY OF THE INVENTION

In accordance with the present invention, a laminate is provided which comprises:
(a) an outer layer of opaque biaxially oriented polymer film structure of lustrous satin appearance which comprises:
(i)
a thermoplastic polymer matrix core having an upper surface and a lower surface and within which is located a strata of voids;
positioned at least substantially within at least a substantial number of voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void;
(ii)
a void-free thermoplastic skin layer adhering to at least the upper surface of said core layer, said skin layer being of a thickness such that the outer, exposed surface thereof does not, at least substantially, manifest the surface irregularities of said core layer;
the population of voids in said core and the thickness of said core being such as to cause a degree of opacity of less than 70% light transmission; and,
(b) a substrate web layer selected from the group consisting of paper and non-woven tissue, the upper surface of which is affixed directly o indirectly to the lower surface of the core layer (a)(i) with or without a laminating adhesive interposed between said surfaces.

Optionally, an intermediate thermoplastic polymer foam layer (c) can be interposed between outer layer (a) and substrate layer (c) to provide additional hiding power for the uneven surface texture of the underlying substrate layer, especially in the case of a rough-textured paper web such as corrugated cardboard.

The process for preparing outer layer (a) of the foregoing laminate structure comprises:
mixing a first thermoplastic polymeric material with a second material incompatible with said first material to form a core mixture, said second material being of a higher melting point or having a higher glass transition temperature than said first material;
heating the core mixture to a temperature at least above the melting point of said first material;
dispersing said second material uniformly throughout the molten first material in the form of microspheres;
extruding the core mixture in the form of a core layer having an upper surface and a lower surface;
adherently applying a thermoplastic skin layer to at least the upper surface of said core layer in a thickness which will not ultimately manifest the surface irregularities of said core layer; and
biaxially orienting the film structure at a temperature and to an extent to form opacifying voids in said core layer so as to optimize the degree of opacity, enhance the physical characteristics and impart a lustrous sating appearance to said film structure.

DESCRIPTION OF THE PREFERRED EMBODIMENTS

In order to achieve the unique lustrous satin appearance of the film structure employed as outer layer (a) of the laminate of the present invention, it is important that a particular thickness relationship exist between the thickness dimension of core (a)(i) and the thickness dimension of skin layer (a)(ii) affixed to the upper surface of said core layer and any additional skin layer (optional) which may be affixed to the lower surface of said core layer. It is preferred that the core thickness be from about 30 to about 85% of the overall structure. This, in combination with the population and configuration of the voids in a structure at least about 0.5 mils thick, will materially contribute to the overall degree of opacity of the structure. Likewise, by maintaining the skin thickness within a particular range in relation to the overall structure and to the thickness of the core layer, the overall combination results in the unique lustrous satin appearance of the film combination constituting outer layer (a). It is preferred that the combined skin thickness be about 15 to about 70% of the overall film structure. It is important that the skin layer(s) be sufficiently thick so that the outer surface(s) thereof do not manifest the irregularities or surface projections of the core material. If this were not the case, the lustrous appearance of the satin finish would be materially lessened.

It is preferred that the average diameter of the void-initiating particles be from about 0.1 to about 10 microns. These particles should be spherical in shape so as to initiate a void of unusual regularity and orientation in a stratified relationship throughout the matrix material after biaxial orientation of the system. This does not mean that every void is the same size. It means that, generally speaking, each void tends to be of like shape, even though the voids may vary in dimensions from one another, because all of the voids are initiated by a spherical particle. Ideally, all of these voids assume a shape defined by two opposed and edge-contacting concave disks. Optimum characteristics of opacity and satin-like appearance are obtained when the two average major dimensions are greater than about 30 microns.

The void-initiating particle material, as indicated above, should be incompatible with the core material, at least at the temperature of biaxial orientation.

The core has been described above as being a thermoplastic polymer matrix within which is located a strata of voids. From this it is to be understood that the voids create the matrix configuration. The term "strata" is intended to convey the understanding that there are a large number of voids creating the matrix and the voids themselves are oriented so that the two major dimensions are aligned in correspondence with the direction of orientation of the polymeric film structure. After each void has been formed through the initiation of a spherical particle, the particle may contribute little else to the system. This is because its refractive index can be close enough to the matrix material that it makes no contribution to opacity. When this is the case, the opacity is principally a function of the light scattering effect which occurs because of the existence of the voids in the system. The opacity of the system can be somewhat enhanced by the inclusion therein of an opacifying pigment dispersed throughout. A particularly preferred proportion of pigment in the core layer can be from about 1 to about 3% by weight of the core. The pigment material is present in such a particle size and shape that it does not, at least in any material sense, contribute any void initiation by itself. The optional presence of the opacifying pigment contributes perhaps 3 to 8% to the degree of opacity of the system.

A typical void of the core is defined as having major dimensions X and Y and minor dimension Z, where dimension X is aligned with the machine direction orientation, dimension Y is aligned with the transverse direction orientation and dimension Z approximately corresponds to the cross-sectional dimension of the spherical particle initiating the void, the X and Y dimensions being significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any destruction of the voids in any of their dimensions. The voids are particularly vulnerable to destruction during sequential orientation if the stretching temperature is too low. Even in simultaneous orientation, if the temperature is too low, the stretching forces will tend to cause internal shredding and void splitting. This leads to a complete loss of control over the integrity of the individual closed voids and consequently the integrity of the matrix polymer. Thus, one skilled in the art following the present general guidelines, can orient at a temperature and to a degree which will yield X and Y dimensions approaching a maximum without causing any substantial splitting, shredding or overall lack of void and matrix integrity.

By way of illustration, room temperature biaxial orientation of a polypropylene matrix containing nylon spheres of the size and amount contemplated herein will not produce the claimed structure. Either void splitting will occur or voids of insignificant size will result. Polypropylene must be oriented at a temperature which happens to be significantly higher than its glass transition temperature. The temperature conditions must permit X and Y to be at least several multiples of the Z dimension without void splitting to any significant degree. If this is accomplished, optimum physical characteristics, including low water vapor transmission rates and a high degree of light scattering, are obtained without void splitting or film fibrillating.

As indicated above, the matrix polymer and the void initiating particle must be incompatible and this term is used in the sense that the materials are two distinct phases. The spherical void-initiating particles constitute a dispersed phase throughout the lower melting polymer which polymer will, ultimately, upon orientation become a void-filled matrix with the spherical particles positioned somewhere in the voids.

As a result of the biaxial orientation of the film structure constituting outer layer (a) of the laminate described herein, in addition to opacifying the core layer of the structure, the orientation improves other physical properties of the outer layer such as, flex-cracking resistance, Elmendorff tear strength, elongation, tensile strength, impact strength and cold strength properties. In addition to this, an extraordinary, rich-looking, lustrous satin appearance is imparted to the film structure. This appearance is not seen in the absence of the skin layer(s) nor if the skin layer(s) are too thin or otherwise substantially reveal the surface imperfections of the core layer. The resulting film can have, in addition to a rich, high quality appearance, low water vapor transmission rate characteristics and low oxygen transmission rate characteristics make it ideal for use in packaging materials.

It is believed that because of the comparative sphericality of the void-initiating particles, the voids are closed cells. This means that there is virtually no path open from one side of the core to the other through which liquid or gas can traverse.

The void-initiating particles can be organic or inorganic so long as they are spherical in shape and within the preferred particle size range so as to initiate the formation of a void, which in a significant number of cases, has a lens-like shape, that is, a lens of the biconvex shape. When a polymeric material is contemplated as the void-initiating particle, it can be a polymer which is co-melted with the polymer of the matrix or core. In this case, it is necessary for it to have a sufficiently higher melting point than the core polymer and be incompatible and capable of assuming a dispersed phase of small spherical particles as the temperature of the co-melted mix is reduced. It is also contemplated that the void initiating particles can be preformed and then uniformly dispersed into a melt of, e.g., polypropylene. This has the advantage of not having to subject the matrix polymer to the temperature of a much higher melting polymer. In this manner, any thermal degradation of the matrix polymer is avoided.

It is believed that because of the number, shape and orientation strata-wise of the matrix voids, a significantly enhanced light scattering effect is obtained by virtue of the present invention. This effect is further enhanced or magnified by the use of the two transparent skin layers of the size relationship mentioned above.

When preformed spheres are employed, it is the shape and size of the sphere that is important rather than the chemical nature of the material, per se. Thus, solid or hollow organic or inorganic spheres of any type can be employed. Interesting effects can be achieved by the use of spheres of different colors. Since statistically each void has approximately one sphere somewhere within the void, interesting and pleasing color and/or reflectance effects can be imparted to the overall layer structure by the use of spheres of different color absorption or reflectance. The light scattered in a particular void is additionally either absorbed or reflected by the void-initiating sphere and a separate color contribution is made to the light scattering in each void.

Thermoplastic resins which can constitute the dispersed phase within the matrix material include the polyamides or nylons of commerce, certain polyesters, such as polyethylene terephthalate acetals, acrylic resins, etc. Inorganic materials include solid or hollow preformed glass spheres, metal beads or spheres, ceramic spheres, etc. In fact, the use of any material which can be formed into spheres without causing thermal degradation of the core material is contemplated.

By the technique of the present invention, light transmission through outer layer (a) of the present laminates can be reduced to as low as about 16%. This would be true in a film having an overall thickness of at least 1.5 mils where the core portion of the film is at least 60% and the individual skin layers is 20%.

While the preferred particle size of the sphere is to be from about 0.1 to about 10 microns, it is particularly preferred that the particle size range from about 0.75 to about 2 microns. The void-initiating particles can be present in up to about 20% by weight of the core layer prior to orientation, a preferred range being from 2 to about 7 percent by weight.

For convenience and more precise control of the formulation and character of the core layer, a master batch technique can be employed either in the case of forming the spherical particles in situ or in adding preformed spheres to the molten core matrix material. After formation of a master batch, appropriate dilution of this system can be made by adding additional thermoplastic core matrix material until the desired proportions are obtained.

It is preferred that the core material and the skin material be coextruded. Thereafter, biaxial orientation is carried out to an extent, and at a temperature, calculated to obtain the maximum degree of opacity without any significant sacrifice in the physical characteristics, including appearance, of the film structure. Obviously, as the materials employed change, the conditions of biaxial orientation will change. By way of exemplification, when employing polypropylene as the material of the core matrix and of the transparent skin layers and when employing nylon-6 as the void-initiating spheres, a machine direction orientation of from 4 to 8 times and a transverse direction orientation of from about 4 to 8 times at a drawing temperature of from 100° C. to 160° C. can be used to provide a biaxially oriented film of from 0.7 to 3 mils overall thickness.

The substrate web layer(s) herein can be selected from a wide variety of paper and non-woven tissue products. As used herein, the term "paper" refers to a cellulosic web ranging from 0.0015–0.030 in. (0.030–0.080 mm) in thickness and having a density of 5–129 lbs. per 1,000 square feet (0.02–0.63 kg/sq. in.). This includes paper, which is generally 0.0015–0.008 in. (0.03–0.20 mm) thick, and paperboard, which is generally 0.008–0.030 in. (0.20–0.8 mm) thick. The term includes corrugated paperboard and "natural kraft paper", i.e., a kraft paper which has not been bleached to a white color or dyed. Another type of paper suitable for use with the present invention is recycled paper including so-called cartonboard, folding cartonboard, and chip board. Chip board is paperboard made from recycled materials that have not been repulped into individual fibers but only broken down to fiber bundles and then manufactured into board. The term "non-woven tissue" refers to any of a large variety of webs obtained from thermoplastic fibers such as spunbonded polyolefin fiber, and, in particular, spunbonded polypropylene fiber, melt-blown microfibers, e.g., also of polypropylene. Examples of the foregoing can be found in U.S. Pat. No. 3,755,527, the disclosure of which is incorporated by reference herein.

Optionally, an intermediate layer of rigid or flexible thermoplastic polymer foam can be interposed between outer layer (a) and substrate web layer (c) to further hide the otherwise visible surface irregularities of the latter. Such intermediate polymer foam layer can be chosen from amongst numerous foam materials known in the art with polyethylene homopolymer or copolymer, polypropylene homopolymer or copolymer, polystyrene and polyester foams being preferred. The thickness of the foam is not critical and can be anywhere from about 0.5 mm to about 2 mm or more.

The various layers constituting the laminate herein can be assembled in adherent relationship while their surfaces are in the tacky state and/or any of numerous known laminating adhesives can be employed in affixing adjacent layer surfaces.

EXAMPLE 1

This example illustrates the preparation of a laminate in accordance with the present invention possessing an outer layer (a) featuring a core of expanded polypropylene and a polypropylene skin layer affixed to the upper surface thereof, the lower surface of the core layer being thermally bonded to a spunbonded polypropylene non-woven tissue substate layer (b).

A mixture of isotactic polypropylene (93 parts, MP 160° C. and a melt index of 4.5) and nylon-6 (7 parts, MP 225° C.) is melted in an extruder provided with a screw of L/D ratio of 20/1. A second extruder provided in association with this first mentioned extruder is supplied with the same polypropylene but without the nylon-6 present. A melt coextrusion is carried out while maintaining the cylinder of the core material at a temperature ranging from 190° C. to 220° C. The polypropylene to be extruded as the skin layer is maintained at a temperature of 200° C. A film structure is coextruded with a core thickness 60% of the total extruded thickness and a skin layer representing the remaining thickness. The unoriented film measures approximately 40 mils in thickness. This sheet is subsequently oriented seven by seven and one-half times using a commercially available sequential biaxially orienting apparatus to provide outer polymer film structure (a). The MD orientation temperature is about 105° C. and the TD orientation is about 135° C. The resulting 1.9 mil film has an opacity of 20% transmission and a 45° gloss of 120%.

While the lower (core) surface of polymer film structure (a) is still at elevated temperature and in the tacky state, it is press-bonded onto a Typar (DuPont) spun-bonded polypropylene non-woven tissue layer (b) having a thickness of about 8 mils and a weight of 1.6 ounces per square yard to provide the finished laminate. The laminate is especially suitable for manufacturing envelopes, mailers and the like.

EXAMPLE 2

Example 1 is substantially repeated except that outer layer (a) is adhesively bonded to non-woven tissue layer (b) employing a conventional ethylene-vinyl acetate laminating adhesive.

EXAMPLE 3

Example 1 is substantially repeated except that the core of outer layer (a) is provided with a second skin layer affixed to its lower surface and the substrate layer is affixed to the exposed surface of said second skin layer.

EXAMPLE 4

Example 2 is substantially repeated but with an identical outer layer (a) being adhesively bonded to the exposed surface of non-woven tissue layer (b).

EXAMPLE 5

Example 3 is substantially repeated but with an identical outer layer (a) being adhesively bonded to the exposed surface of non-woven tissue layer (b).

EXAMPLE 6

An outer layer (a) is obtained by coextrusion in substantially the same manner as described in Example 1. The exposed (core) surface of this outer film structure is then flame-bonded to the upper surface of an intermediate flexible polypropylene foam layer (c) of about 10 mils thickness, the lower surface of said foam layer being melt-bonded to a conventional corrugated paperboard substrate (b).

What is claimed is:

1. A laminate which comprises:
    (a) an outer layer of opaque biaxially oriented polymer film structure of lustrous satin appearance which comprises:
        (i) a thermoplastic polymer matrix core having an upper surface and a lower surface and within which is located a strata of voids; positioned at least substantially within at least a substantial number of voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void;
        (ii) a void-free thermoplastic skin layer adhering to at least the upper surface of said the upper core layer, said skin layer being of a thickness such that the outer, exposed surface thereof does not, at least substantially, manifest the surface irregularities of said core layer;
            the population of voids in said core and the thickness of said core being such as to cause a degree of opacity of less than 70% light transmission; and,
    (b) a substrate web layer selected from the group consisting of paper and non-woven tissue, the upper surface of which is affixed directly or indirectly to the lower surface of core layer (a)(i) with or without a laminating adhesive interposed between said surfaces.

2. The laminate structure of claim 1 wherein in said outer layer (a), said spherical particle is inorganic.

3. The laminate of claim 1 wherein in said outer layer (a), said spherical particle is an organic material.

4. The laminate of claim 1 wherein in said outer layer (a), said organic material is a polymer.

5. The laminate of claim 1 wherein in said outer layer (a), said structure is a coextruded structure.

6. The laminate of claim 1 wherein in said outer layer (a), said skin layers are of the same polymeric material as said matrix material.

7. The laminate of claim 6 wherein in said outer layer (a), the skin layer(s) and core layer are isotactic polypropylene.

8. The laminate of claim 1 wherein the substrate layer (b) is paper.

9. The laminate of claim 1 wherein the substrate layer (b) is non-woven tissue.

10. The laminate of claim 1 wherein a thermoplastic polymer foam layer (c) is interposed between outer layer (a) and substrate layer (b).

11. The laminate of claim 8 wherein a thermoplastic polymer foam layer (c) is interposed between outer layer (a) and paper substrate layer (b).

12. The laminate of claim 9 wherein a thermoplastic polymer foam layer (c) is interposed between outer layer (a) and non-woven tissue substrate layer (b).

13. The laminate of claim 11 wherein outer layer (a) and thermoplastic polymer foam layer (c) are fabricated from polypropylene.

14. The laminate of claim 12 wherein outer layer (a), non-woven tissue substrate layer (b) and thermoplastic polymer foam layer are fabricated from polypropylene.

* * * * *